Figures 1, 2:
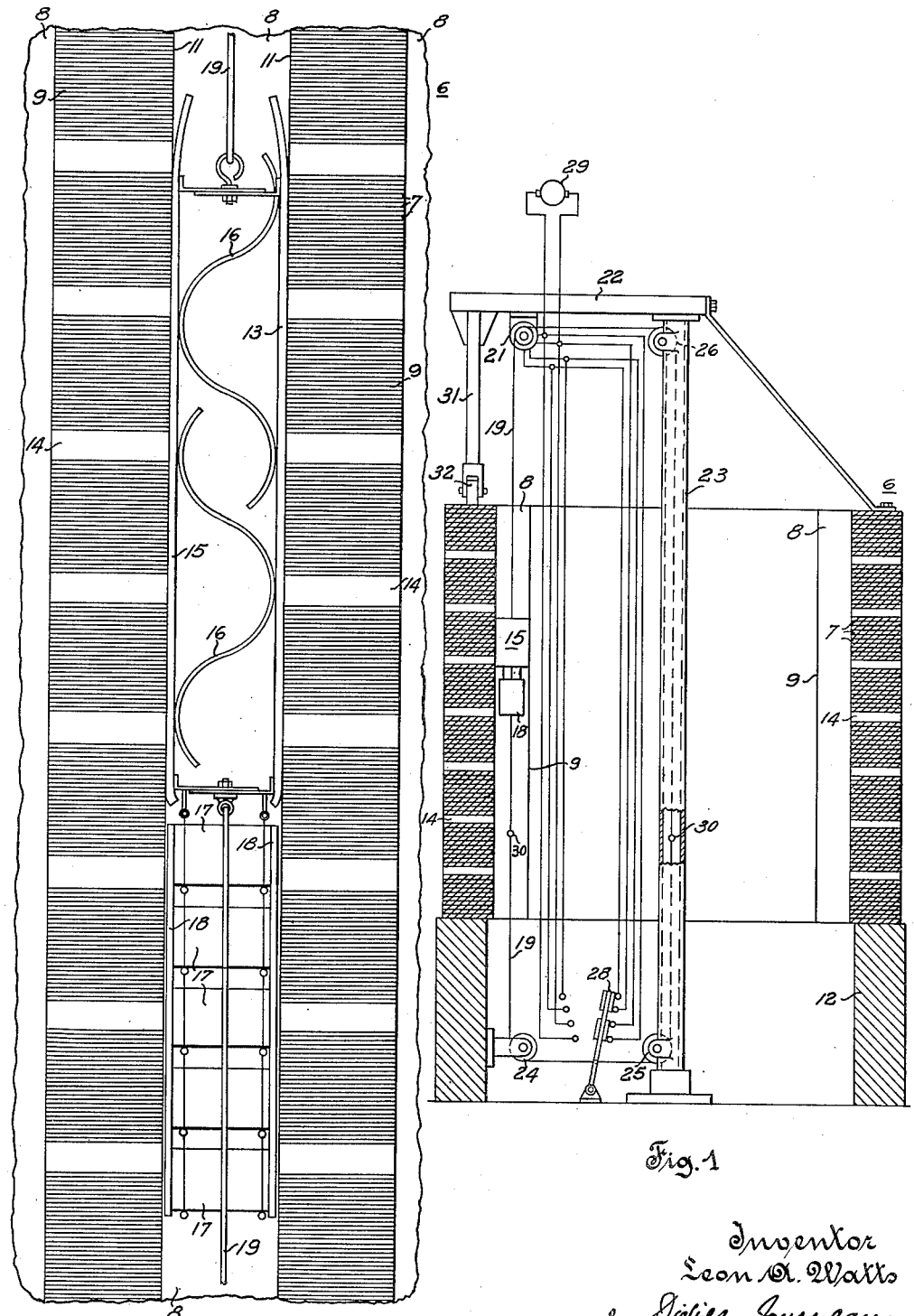

Sept. 22, 1953     L. A. WATTS     2,652,619
DEVICE FOR MECHANICALLY SIZING THE SLOTS OF MAGNETIC CORES
Filed Feb. 16, 1948

Inventor
Leon A. Watts
by Didier Journeaux
Attorney

Patented Sept. 22, 1953

2,652,619

UNITED STATES PATENT OFFICE 2,652,619

DEVICE FOR MECHANICALLY SIZING THE SLOTS OF MAGNETIC CORES

Leon A. Watts, Milwaukee, Wis., assignor to Allis-Chalmers Manufacturing Company, Milwaukee, Wis., a corporation of Delaware Application February 16, 1948, Serial No. 8,657

1 Claim. (Cl. 29—76)

This invention relates in general to improvements in machine tools, and more particularly to a machine for finishing the slots of laminated cores to predetermined dimensions.

Laminated cores of dynamoelectric machines and of other electrical apparatus are frequently provided with slots for the insertion of electrical conductors therein. The slotted cores are generally formed from laminations which are punched to present individual slots, the laminations being stacked with their slots in alinement. The dimensions and the spacings of the different slots of each lamination are however subject to the usual manufacturing tolerances. The means for holding the stacked laminations to form a core structure are also subject to manufacturing tolerances. The result is that the slots of the stacked laminations do not line up accurately and that a conductor which fits into a slot of an individual lamination may not fit into a slot of the assembled core. Even if the conductor could be inserted within the slot it would rest only on the edges of a portion of the laminations and therefore would be insecurely supported.

To bring the slots of the assembled core to the desired dimension and to give to the walls thereof the desired degree of smoothness, it is therefore advantageous to cause a suitable cutting tool, such as a file or a broach, to be moved longitudinally in each slot by suitable power means. Suitable means are provided to apply the file or other tool against at least one of the walls of the slot, and means are also preferably provided to collect the filings removed from the core by the tool. If the core is cylindrical, the power means are preferably associated with a jib crane or an equivalent device mounted axially of the core to facilitate the successive filing or sizing of all the slots distributed about the bore or the periphery of the core.

It is therefore an object of the present invention to provide a device for filing or broaching the slots of a laminated core which will remove protruding edges of laminations substantially without affecting other non-protruding edges.

Another object of the present invention is to provide a device for filing the slots of a laminated core and simultaneously collecting the filings removed from the core material.

Another object of the present invention is to provide a device for filing the slots of a laminated core which can be conveniently shifted from one slot to another.

Objects and advantages other than those above set forth will be apparent from a consideration of the following description when taken in connection with the accompanying drawings in which:

Fig. 1 is a view in vertical cross section through the stator core of a dynamoelectric machine showing a slot filing device mounted for successively filing the different slots of the stator bore; and Fig. 2 is a view in elevation of a portion of the inner surface of the core illustrated in Fig. 1 showing a pair of cutting tools and a plurality of filing collecting magnets in place in a slot.

Referring more particularly to the drawing by characters of reference, numeral 6 generally designates a cylindrical laminated core adapted to form a part of a dynamoelectric machine. Core 6 is built up of individual laminations 7 made of any suitable material such as silicon steel. Each lamination may be annular in relatively small machines, and may be of segmental shape at least in relatively large machines.

The laminations are punched to define one or more slots 8, the walls of which are formed by intervening teeth 9 integral with the body of the lamination.

The edges 11 of the teeth of superposed laminations are generally in alinement to form the surface of the walls of the slots but may depart from exact registration by an amount corresponding to the manufacturing tolerances, so that the edges require a certain amount of filing or machining.

The filing operation may be performed on the core resting on its side with its axis in the horizontal direction. It is however often preferable to operate on the core disposed with its axis in the vertical direction as shown. The core is then raised above ground by suitable supporting members 12, which may form a part of the frame (not shown) of the finished machine.

The filing device comprises at least one cutting tool 13, which is preferably a file of any type suitable for operating on silicon steel laminations, but which may also be a rasp or a broach. The file or other sizing tool may be curved at one end or at both ends to prevent its penetrating the ventilating ducts 14 of the core to be filed. Means are provided for applying file 13 against the edges 11 of the teeth 9 defining one side of the slot 8 containing the file. In a preferred embodiment of the invention, file 13 is associated with a second file 15 disposed alongside thereof. The two files are applied against the opposite walls of a slot by resilient or rigid means such as springs 16, or by equivalent means such as sponge rubber pad.

The filings removed by files 13, 15 are preferably collected by means of a set of permanent magnets 17 attached to the file assembly by any suitable means. To prevent magnets 17 from adhering to the teeth 9 of the core, the magnets may be separated from the walls of teeth 9 by means of guides 18 of any suitable nonmagnetic material such as fiber or aluminum. The guides also prevent the magnets from penetrating into the ventilating ducts 14 of the core. The nonmagnetic guides 18 are spaced closely to the walls of teeth 9 and are of substantial cross section so that lateral displacement of the train of magnets 17 will cause only relatively small unequal clearance between the guides 18 and the walls of the teeth defining the slot in which the filing device is operated. Filings tending to adhere to the outsides of the guides 18, if brushed off by the walls of the slot or by the air ducts 14 of the core, fall into the train and are attracted to and collected by the magnets 17.

It will be understood that files 13, 15 and magnets 17 may be made of any suitable shape and size and in any suitable number of parts as may be required for filing the slots on their entire depth. In Fig. 2, only magnets lying in the bottom portion of the slot are shown, the magnets disposed in the top portion of the slot being assumed removed. If desired the files may also be caused to engage a predetermined limited portion of the wall of each slot during each passage of the files through a slot.

To cause the files and the magnets to be moved longitudinally in a slot, the files are attached to a rigid or flexible traction means such as a cable 19 associated with suitable power means such as a hoist 21. The hoist may be of any suitable known type and may be driven by an electric motor, by a compressed air motor, or otherwise. The hoist may be disposed with its drum in substantial alinement with the particular slot 8 to be filed. For this purpose the hoist may be supported from a jib crane or beam comprising a radial arm 22 mounted for rotary movement on a shaft 23 supported coaxially of core 6. Cable 19 may be led from the drum of hoist 21 over suitable adjustable guiding pulleys 24, 25, 26. If shaft 23 is in the form of a pipe, pulleys 25, 26 may be so disposed as to guide cable 19 along the axis of the shaft. The drum of hoist 21 and pulley 24 serve to guide cable 19 in a slot 8 within which the files are moved.

The operation of hoist 21 may be controlled in any suitable known manner. If desired, a reversing switch 28 may be provided for controlling the direction of rotation of the hoist. If the hoist is electrically driven, switch 28 may be inserted in the connections between one of the elements of the hoist motor and a source of electric current 29, as is well known. Dogs 30 may be fastened to cable 19 to engage switch 28 and cause reversal of the switch in response to the movement of the files into a position at one or the other end of a slot 8, whereby a continued reciprocating movement of the files may be obtained.

The free end of arm 22 may be supported on core 6 by suitable means such as a standard 31. Wheels 32 may be provided at the base of standard 31 to permit arm 22 to be moved easily from one radial direction to the other.

Arm 22 being disposed above a particular slot of core 6, the files may be caused to move up and down through the slot by periodically reversing hoist 21. To reduce the wear on the files, they may also be moved in the slot in one direction only, upward for example, and may be guided outside of the slot to return to the bottom of the core. When this procedure is adopted, cable 19 is preferably fastened only at one end of the files. The files may be caused to traverse each slot only once or may be passed therethrough any desired number of times. Between passages of the files through a slot the filings collected by magnets 17 are preferably removed by wiping the magnets with a cloth or by blowing off the filings by compressed air.

Although but one embodiment of the present invention has been illustrated and described, it will be understood that changes and modifications may be made therein without departing from the spirit of the invention or the scope of the appended claim.

It is claimed and desired to secure by Letters Patent:

A device for filing the slots of a cylindrical laminated core having a vertical axis, said slots being longitudinally and symmetrically disposed with respect to the axis of said core, said device comprising a shaft, said shaft mounted coaxially of said core, a radial arm mounted on said shaft for rotary movement about the axis of said core, a file comprising two members, a spacer disposed between said members to space apart said members for engaging opposite walls of one of said slots, a hoist including a cable attached to said file for longitudinally stroking said file in one direction only in said one of said slots, said file being guided outside said slots during the return stroke, said hoist mounted on said arm with said cable aligned with said one of said slots pulling said file therethrough, means rotating said arm about said shaft into different positions corresponding to different said slots to align said file and said cable with another one of said slots, and magnet means attached to said file and disposed immediately below said file in said one of said slots for collecting filings removed from said core by an upward stroke of said file before said filings reach the portion of said one of said slots extending below said magnet means.

LEON A. WATTS.

References Cited in the file of this patent

UNITED STATES PATENTS

| Number | Name | Date |
|---|---|---|
| 532,819 | Riddell | Jan. 22, 1895 |
| 1,160,452 | Sargent | Nov. 16, 1915 |
| 1,297,090 | Campbell et al. | Mar. 11, 1919 |
| 2,104,062 | Temple | Jan. 4, 1938 |
| 2,247,502 | Johnson | July 1, 1941 |
| 2,268,028 | Fairbairn | Dec. 30, 1941 |

FOREIGN PATENTS

| Number | Country | Date |
|---|---|---|
| 78,479 | Germany | Dec. 3, 1894 |
| 79,797 | Germany | Apr. 5, 1894 |
| 238,556 | Great Britain | Nov. 26, 1925 |